(12) United States Patent
Kim et al.

(10) Patent No.: US 8,543,109 B2
(45) Date of Patent: Sep. 24, 2013

(54) MOBILE COMMUNICATION DEVICE HAVING PLURALITY OF SUBSCRIBER IDENTIFICATION MODULE (SIM) CARDS AND METHOD FOR SELECTING PUBLIC LAND MOBILE NETWORK (PLMN) IN THE DEVICE

(75) Inventors: Hong Kim, Seoul (KR); Yi Ha Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 13/246,279

(22) Filed: Sep. 27, 2011

(65) Prior Publication Data
US 2012/0077494 A1   Mar. 29, 2012

(30) Foreign Application Priority Data
Sep. 27, 2010  (KR) .......................... 10-2010-0092981

(51) Int. Cl.
*H04W 60/00* (2009.01)

(52) U.S. Cl.
USPC ....................................... 455/435.1; 455/436

(58) Field of Classification Search
USPC ............................... 455/410, 433, 435.1, 436
See application file for complete search history.

(56) References Cited

U.S. PATENT DOCUMENTS
2007/0270147 A1* 11/2007 Choi et al. .................... 455/436

OTHER PUBLICATIONS
ETSI TS 123 122 V3.9.0 (Dec. 2002) Universal Mobile Telecommunications System (UMTS); Non-Access-Stratum functions related to Mobile Station (MS) in idle mode (3GPP TS 23.122 version 3.9.0 Release 1999).

* cited by examiner

*Primary Examiner* — Sam Bhattacharya
(74) *Attorney, Agent, or Firm* — Jefferson IP Law, LLP

(57) ABSTRACT

A mobile communication device including Subscriber Identification Module (SIM) cards, and various methods for searching for a Public Land Mobile Network (PLMN) for each SIM card, are provided. In one method, the device separately starts Home PLMN (HPLMN) timers according to corresponding HPLMN timer values stored respectively in the SIM cards, performs a PLMN search for one of the SIM cards at an expiry of a corresponding one of the HPLMN timers, and updates a PLMN list with one or more PLMNs found during the PLMN search. The device then determines, for all of the SIM cards, whether the PLMN list contains any PLMN with a higher priority than a currently registered PLMN. Also, the device performs, for any SIM card of the SIM cards in which there is any PLMN with the higher priority than the currently registered PLMN, a location registration in the PLMN with the higher priority.

13 Claims, 11 Drawing Sheets

MOBILE COMMUNICATION DEVICE HAVING PLURALITY OF SUBSCRIBER IDENTIFICATION MODULE (SIM) CARDS AND METHOD FOR SELECTING PUBLIC LAND MOBILE NETWORK (PLMN) IN THE DEVICE

PRIORITY

This application claims the benefit under 35 U.S.C. §119(a) of a Korean patent application filed on Sep. 27, 2010 in the Korean Intellectual Property Office and assigned Serial No. 10-2010-0092981, the entire disclosure of which is hereby incorporated by reference.

BACKGROUND OF THE INVENTION

1. Field of the Invention

The present invention relates to Public Land Mobile Network (PLMN) search and selection technologies in a mobile communication device. More particularly, the present invention relates to a mobile communication device having a plurality of Subscriber Identification Module (SIM) cards and methods for searching for a PLMN for each SIM card in the mobile communication device.

2. Description of the Related Art

A mobile communication device performs a process of selecting a Public Land Mobile Network (PLMN) in order to start a mobile communication service. Namely, when powered on, the mobile communication device searches for PLMNs located nearby in order to allow a mobile communication service to select a PLMN with the highest priority. Once a PLMN with the highest priority is found, the mobile communication device performs a location registration. Here, the PLMN with the highest priority is often referred to as a home PLMN (HPLMN), and information about HPLMN is stored as International Mobile Subscriber Identity (IMSI) information in a Subscriber Identification Module (SIM) card. If the mobile communication device fails to find the HPLMN and therefore performs a location registration by selecting a PLMN other than the HPLMN, the device considers a location-registered PLMN as a Visited PLMN (VPLMN) and periodically searches for a PLMN with a higher priority than the VPLMN. If any PLMN with a higher priority than a currently registered VPLMN is found, the mobile communication device performs a location registration with the found PLMN.

During a PLMN search, the mobile communication device performs a scanning at regular intervals. A scanning cycle is stored as a higher priority PLMN search period (EF_HPPLMN) of a SIM card. When registered in any VPLMN, the mobile communication device searches for the HPLMN at such a scanning cycle.

The mobile communication device that has a plurality of SIM cards searches for PLMNs independently for each SIM card according to scanning cycles stored in the SIM cards.

FIG. 1 shows a technique to search for a PLMN in a mobile communication device having a plurality of SIM cards in accordance with the related art.

Referring to FIG. 1, the mobile communication device starts HPLMN timers independently for SIM 1 and SIM 2, and then performs a PLMN search at the expiry of each HPLMN timer. In the example shown in FIG. 1, the mobile communication device searches for a PLMN according to a scanning cycle (e.g., 30 minutes) stored in the SIM 1 and also searches for a PLMN according to another scanning cycle (e.g., 60 minutes) stored in the SIM 2.

Normally a PLMN search causes an increase of power consumption. Since the mobile communication device having a plurality of SIM cards starts the HPLMN timers independently according to HPLMN timer values stored in the respective SIM cards and then performs a PLMN search at the expiry of each HPLMN timer, relatively greater power consumption may be caused in comparison with a mobile communication device having a single SIM card.

SUMMARY OF THE INVENTION

Aspects of the present invention are to address at least the above-mentioned problems and/or disadvantages and to provide at least the advantages described below.

Another aspect of the present invention is to reduce the number of Public Land Mobile Network (PLMN) searches and thus to reduce power consumption in a mobile communication device having a plurality of Subscriber Identification Module (SIM) cards.

Another aspect of the present invention is to reduce an amount of time used for Home PLMN (HPLMN) searches for respective SIM cards in a mobile communication device having a plurality of SIM cards.

According to an aspect of the present invention, a method for searching for a PLMN in a mobile communication device having a plurality of SIM cards is provided. The method includes separately starting a plurality of HPLMN timers according to a corresponding plurality of HPLMN timer values stored respectively in the plurality of SIM cards, performing a PLMN search for one of the plurality of SIM cards at an expiry of a corresponding one of the plurality of HPLMN timers, updating a PLMN list with one or more PLMNs found during the PLMN search, for all the plurality of SIM cards, determining whether the PLMN list contains any PLMN with a higher priority than a currently registered PLMN, and for any SIM card of the plurality of SIM cards in which there is any PLMN with a higher priority than the currently registered PLMN, performing a location registration in the PLMN with the higher priority.

According to another aspect of the present invention, a method for searching for a PLMN in a mobile communication device having a first SIM card, a second SIM card, a first communication mode control unit for controlling the first SIM card, and a second communication mode control unit for controlling the second SIM card is provided. The method includes at the first communication mode control unit, starting a first HPLMN timer according to a first HPLMN timer value stored in the first SIM card, and at the second communication mode control unit, starting a second HPLMN timer according to a second HPLMN timer value stored in the second SIM card, at the first communication mode control unit, performing a first PLMN search at an expiry of the first HPLMN timer, at the first communication mode control unit, updating a first PLMN list with one or more PLMNs found during the first PLMN search, at the first communication mode control unit, notifying the second communication mode control unit of the update of the first PLMN list, at the first communication mode control unit, determining whether the first PLMN list contains any PLMN with a higher priority than a currently registered PLMN, and at the second communication mode control unit, determining whether the first PLMN list contains any PLMN with a higher priority than the currently registered PLMN, and if the first PLMN list contains any PLMN with the higher priority than the currently registered PLMN, at each of the first and second communication mode control units, performing a location registration in the PLMN with the higher priority.

According to still another aspect of the present invention, a method for searching for a PLMN in a mobile communication device having a first SIM card and a second SIM card is provided. The method includes starting a first HPLMN timer according to a first HPLMN timer value stored in the first SIM card, and starting a second HPLMN timer according to a second HPLMN timer value stored in the second SIM card, performing a first PLMN search at an expiry of the first HPLMN timer, creating a first PLMN list with one or more PLMNs found during the first PLMN search and storing the first PLMN list, determining whether the first PLMN list contains any PLMN with a higher priority than a currently registered PLMN with regard to the first SIM card, and determining whether the first PLMN list contains any PLMN with a higher priority than the currently registered PLMN with regard to the second SIM card, and if the first PLMN list contains any PLMN with the higher priority than the currently registered PLMN with regard to the first SIM card, performing a location registration in the PLMN with the higher priority with regard to the first SIM card, and if the first PLMN list contains any PLMN with the higher priority than the currently registered PLMN with regard to the second SIM card, performing the location registration in the PLMN with the higher priority with regard to the second SIM card.

According to yet another aspect of the present invention, a mobile communication device is provided. The device includes a first SIM card for storing a first timer value of a first HPLMN timer, a second SIM card for storing a second timer value of a second HPLMN timer, a memory unit for storing a first PLMN list updated by a first communication mode control unit and a second PLMN list updated by a second communication mode control unit, the first communication mode control unit for starting the first HPLMN timer, for controlling to perform a PLMN search at an expiry of the first HPLMN timer, to create the first PLMN list with one or more PLMNs found during the first PLMN search, for storing the first PLMN list in the memory unit, for controlling to notify the second communication mode control unit of an update of the first PLMN list, for determining whether the first PLMN list contains any PLMN with a higher priority than a currently registered PLMN, and if the first PLMN list contains any PLMN with the higher priority than the currently registered PLMN, for controlling to perform a location registration in the PLMN with the higher priority, and the second communication mode control unit for starting the second HPLMN timer, for determining whether the first PLMN list contains any PLMN with the higher priority than the currently registered PLMN when the notification of the update of the first PLMN list is received from the first communication mode control unit, and if the first PLMN list contains any PLMN with the higher priority than the currently registered PLMN, for controlling to perform the location registration in the PLMN with the higher priority.

According to the above aspects of the present invention, the total number of PLMN searches may be reduced and thus battery consumption may be reduced in a case where a mobile communication device having a plurality of SIM cards searches for PLMNs for the respective SIM cards. Additionally, since the results of every PLMN search are shared among all SIM cards and used for selecting HPLMN for all SIM cards, a total time used for searching for a HPLMN for all SIM cards is reduced.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For convenience in description, exemplary embodiments of the present invention are described in the context of a mobile communication device that includes first and second Subscriber Identification Module (SIM) cards. However, the present invention is not limited thereto. For example, exemplary embodiments of the present invention may also be applied to any other mobile communication device having three or more SIM cards.

Among terms set forth herein, the term 'the first communication mode' refers to a mode in which a communication is performed through authentication information stored in the first SIM card. Similarly, the term 'the second communication mode' refers to a mode in which a communication is performed through authentication information stored in the second SIM card.

In this disclosure, the first and second communication modes may correspond to the second generation communication mode such as Global System for Mobile Communication (GSM), General Packet Radio System (GPRS), Enhanced Data GSM Environment (EDGE) or the like, and the third generation communication mode such as Wideband Code Division Multiple Access (WCDMA), Universal Mobile Telecommunication System (UMTS) or the like. The first and second communication modes may be equal to or different from each other.

Figure 1:
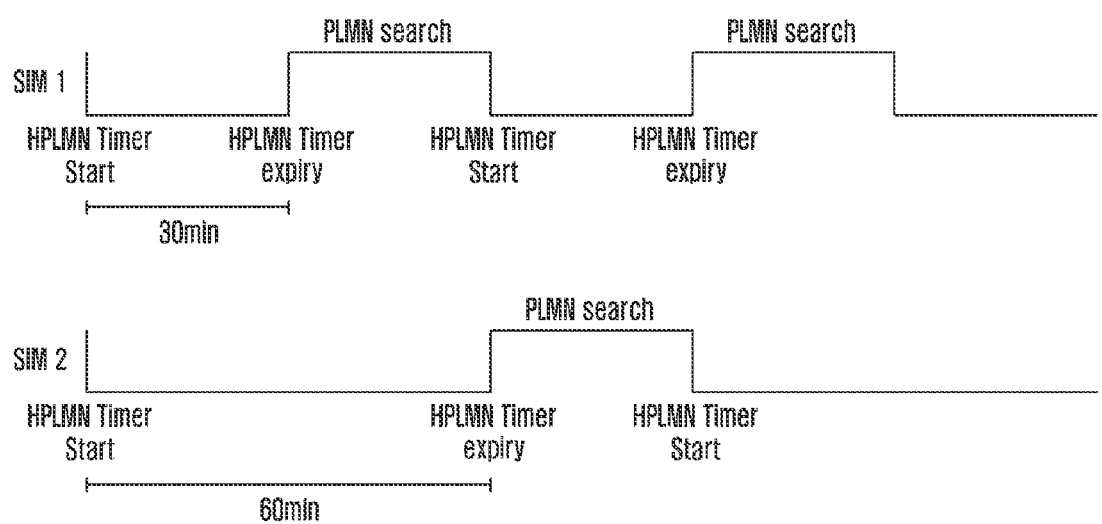
FIG. 1 shows a conventional technique to search for a Public Land Mobile Network (PLMN) in a mobile communication device having a plurality of Subscriber Identification Module (SIM) cards in accordance with the related art.
Figure 2:
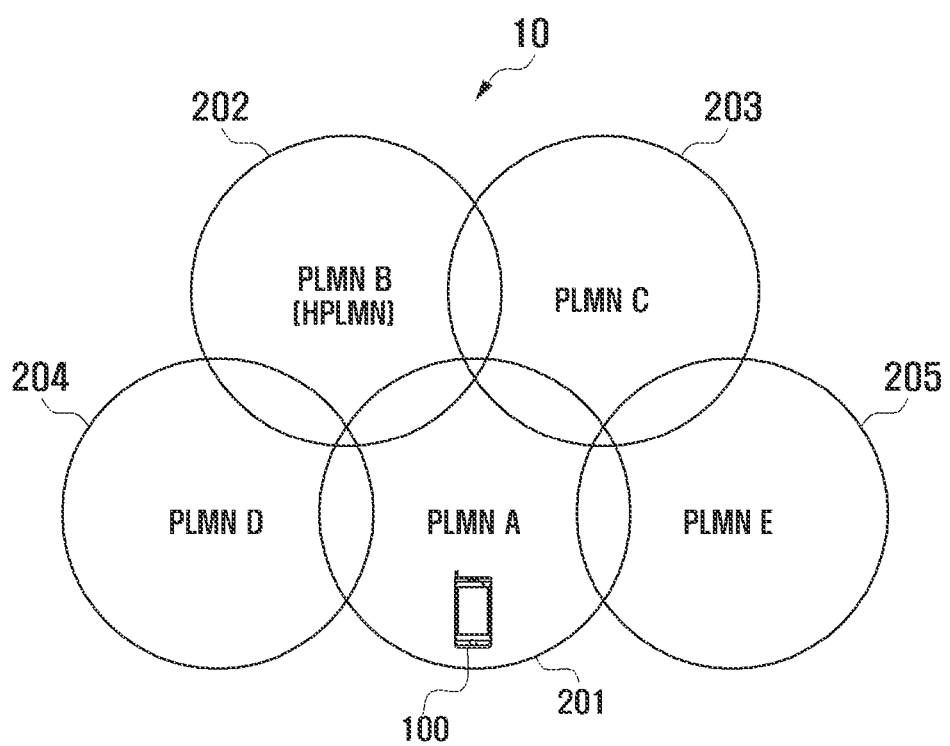
FIG. 2 is a schematic diagram illustrating a mobile communication system in accordance with an exemplary embodiment of the present invention.

FIG. 2 is a schematic diagram illustrating a mobile communication system according to an exemplary embodiment of the present invention. The mobile communication system 10 shown in FIG. 2 includes a mobile communication device 100, a Public Land Mobile Network (PLMN) A 201, a PLMN B 202, a PLMN C 203, a PLMN D 204, and a PLMN E 205. Each PLMN 201, 202, 203, 204 and 205 may be composed of a plurality of Base Stations (BSs) that perform call and data communications with the mobile communication device 100, a Base Station Controller (BSC) that controls the plurality of BSs, and a Mobile Switching Center (MSC) that controls a network.

Referring to FIG. 2, the mobile communication device 100 registers its location in the PLMN A 201 and then tries to select the PLMN. If the PLMN B 202 is a Home PLMN (HPLMN), the PLMN A 201 is a Visiting PLMN (VPLMN). Since the location of the mobile communication device 100 is not currently registered in the HPLMN, namely PLMN B 202, the mobile communication device 100 periodically searches for PLMNs in order to find the HPLMN or any other PLMN with a higher priority than the PLMN A 201 in which the location of the mobile communication device 100 is currently registered.

Each PLMN 201, 202, 203, 204 and 205 is one of GSM, GPRS, EDGE, WCMA and UMTS, and the mobile communication device 100 uses at least one service among GSM, GPRS, EDGE, WCMA and UMTS. For convenience in description, it is assumed herein that the PLMNs 201, 202, 203, 204 and 205 all support a roaming service.

The mobile communication device 100 includes the first SIM card and the second SIM card. Using HPLMN timer values respectively stored in the first and second SIM cards, the mobile communication device 100 separately starts the HPLMN timers. Once the HPLMN timer of the first SIM card reaches expiry, the mobile communication device 100 searches for the PLMNs and uses the search results for PLMN selections of the first and second communication modes.

Figure 3:
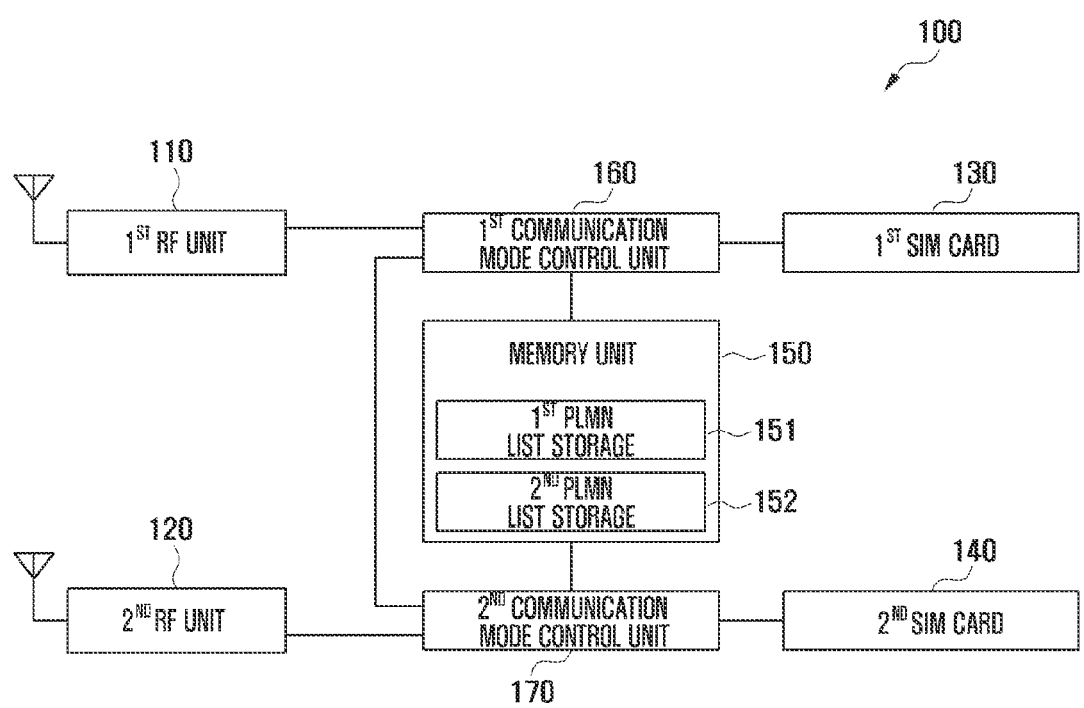
FIG. 3 is a block diagram illustrating a mobile communication device in accordance with an exemplary embodiment of the present invention.

FIG. 3 is a block diagram illustrating a mobile communication device in accordance with an exemplary embodiment of the present invention. The mobile communication device 100 shown in FIG. 3 is applied to PLMN selection methods in accordance with first and second exemplary embodiments which will be discussed below. The mobile communication device 100 in FIG. 3 is characterized by having first and second communication mode control units 160 and 170.

Referring to FIG. 3, the mobile communication device 100 includes a first Radio Frequency (RF) unit 110, a second RF unit 120, a first SIM card 130, a second SIM card 140, a memory unit 150, the first communication mode control unit 160, and the second communication mode control unit 170.

The first and second RF units 110 and 120 perform a function to transmit and receive data for a wireless communication of the mobile communication device 100. Each of the first and second RF units 110 and 120 may include an RF transmitter that up-converts the frequency of an outgoing signal and then amplifies the signal, an RF receiver that amplifies with low-noise an incoming signal and down-converts the frequency of the signal, and the like. Additionally, the first RF unit 110 may receive data through a wireless channel and then output the data to the first communication mode control unit 160, and also receive data from the first communication mode control unit 160 and then transmit the data through a wireless channel. Similarly, the second RF unit 120 may receive data through a wireless channel and then output the data to the second communication mode control unit 170, and also receive data from the second communication mode control unit 170 and then transmit the data through a wireless channel. Particularly, each of the first and second RF units 110 and 120 scans a specific frequency band and thereby performs a PLMN search. Although FIG. 3 illustrates two separate RF units 110 and 120, the mobile communication device 100 in another exemplary embodiment may have the RF units 110 and 120 united in the form of a single module, or may include additional RF units.

Each of the first and second SIM cards 130 and 140 stores a variety of user information. Each of the SIM cards 130 and 140 has a microprocessor and a memory chip and is structured in a suitable form for being inserted into and removed from the mobile communication device 100. Each of the first and second SIM cards 130 and 140 has information about IDentifiers (IDs) and priorities of PLMNs including the HPLMN and also stores a given HPLMN timer value.

The memory unit 150 stores programs and data used for operations of the mobile communication device 100 and may consist of a program region and a data region. Additionally, the memory unit 150 may be composed of volatile memories, non-volatile memories, or a combination thereof. More particularly, the memory unit 150 includes the first PLMN list storage 151 and the second PLMN list storage 152. The first PLMN list storage 151 stores the first PLMN list created by the first communication mode control unit 160, and the second PLMN list storage 152 stores the second PLMN list created by the second communication mode control unit 170. Although FIG. 3 illustrates separate PLMN list storages 151 and 152, the memory unit 150 in another exemplary embodiment may have a single storage for the first and second PLMN list storages 151 and 152. Furthermore, in another exemplary embodiment, the first and second PLMN lists may be united into a single common PLMN list.

The first communication mode control unit 160 is a controller for controlling the first communication mode. The first communication mode control unit 160 retrieves PLMN information, priority information, and the HPLMN timer value from the first SIM card 130. The first communication mode control unit 160 may have an internal timer to be used for the HPLMN timer and starts the HPLMN timer according to the HPLMN timer value of the first SIM card 130. At the expiry of the HPLMN timer, the first communication mode control unit 160 searches for PLMNs by controlling the first RF unit 110, creates the first PLMN list with found PLMNs, and stores the first PLMN list in the first PLMN list storage 151. The first communication mode control unit 160 determines whether the first PLMN list contains any PLMN with a higher priority than the current PLMN, and if so, performs a location registration in the PLMN with the higher priority by controlling the first RF unit 110. After creating the first PLMN list, the first communication mode control unit 160 notifies the second communication mode control unit 170 of the update of the first PLMN list.

If the HPLMN timer expires before the first communication mode control unit 160 receives the notification of the update of the second PLMN list from the second communication mode control unit 170, the first communication mode control unit 160 searches for PLMNs by controlling the first RF unit 110. If the notification of the update of the second PLMN list is received from the second communication mode control unit 170 before the HPLMN timer expires, the first communication mode control unit 160 accesses the second PLMN list storage 152 and determines whether the second PLMN list contains any PLMN with a higher priority than the current PLMN. If so, the first communication mode control unit 160 performs a location registration in the PLMN with the higher priority by controlling the first RF unit 110.

In an exemplary embodiment, when notifying the second communication mode control unit 170 of an update of the first PLMN list, the first communication mode control unit 160 may also send information about a scanned frequency band. This information about a scanned frequency band is used for the second communication mode control unit 170 to determine a frequency band to be further scanned. If information about a scanned frequency band is received from the second communication mode control unit 170, the first communication mode control unit 160 determines a frequency band to be further scanned by using the received information.

The second communication mode control unit 170 is a controller for controlling the second communication mode. The second communication mode control unit 170 retrieves PLMN information, priority information, and the HPLMN timer value from the second SIM card 140. The second communication mode control unit 170 may have an internal timer to be used for the HPLMN timer and starts the HPLMN timer according to the HPLMN timer value of the second SIM card 140. At the expiry of the HPLMN timer, the second communication mode control unit 170 searches for PLMNs by controlling the second RF unit 120, creates the second PLMN list with found PLMNs, and stores the second PLMN list in the second PLMN list storage 152. The second communication mode control unit 170 determines whether the second PLMN list contains any PLMN with a higher priority than the current PLMN, and if so, performs a location registration in such a PLMN with a higher priority by controlling the second RF unit 120. After creating the second PLMN list, the second communication mode control unit 170 notifies the first communication mode control unit 160 of an update of the second PLMN list.

If the HPLMN timer expires before the second communication mode control unit 170 receives the notification of an update of the first PLMN list from the first communication mode control unit 160, the second communication mode control unit 170 searches for the PLMNs by controlling the second RF unit 120. If the notification of an update of the first PLMN list is received from the first communication mode control unit 160 before the HPLMN timer expires, the second communication mode control unit 170 accesses the first PLMN list storage 151 and determines whether the first PLMN list contains any PLMN with a higher priority than the current PLMN. If so, the second communication mode control unit 170 performs a location registration in such a PLMN with a higher priority by controlling the second RF unit 120.

In an exemplary embodiment, when notifying the first communication mode control unit 160 of an update of the second PLMN list, the second communication mode control unit 170 may also send information about a scanned frequency band. If information about the scanned frequency band is received from the first communication mode control unit 160, the second communication mode control unit 170 determines a frequency band to be further scanned by using the received information.

Figure 4A:
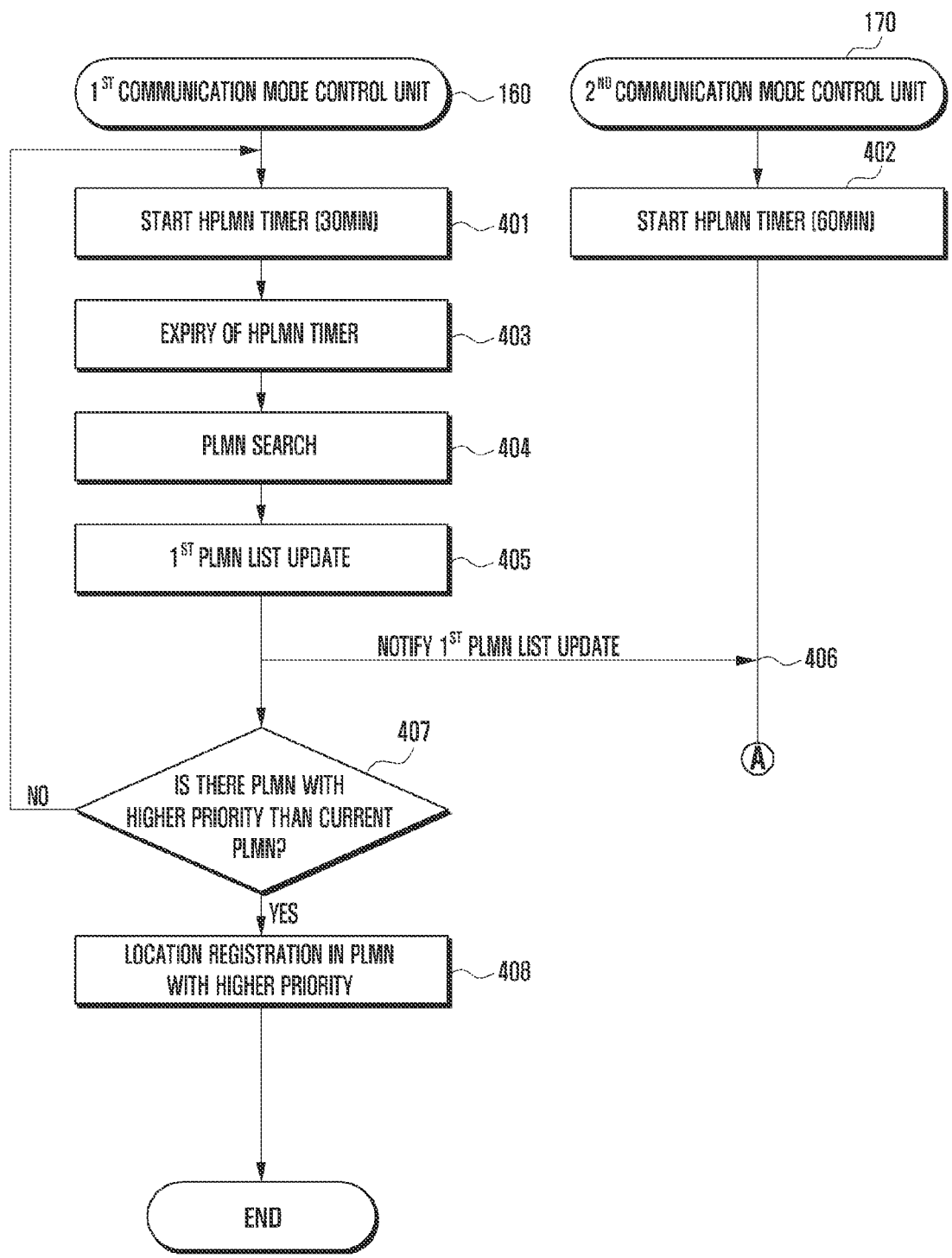
FIGS. 4A and 4B are flow diagrams illustrating a method for selecting a PLMN in a mobile communication device in accordance with a first exemplary embodiment of the present invention.
Figure 4B:
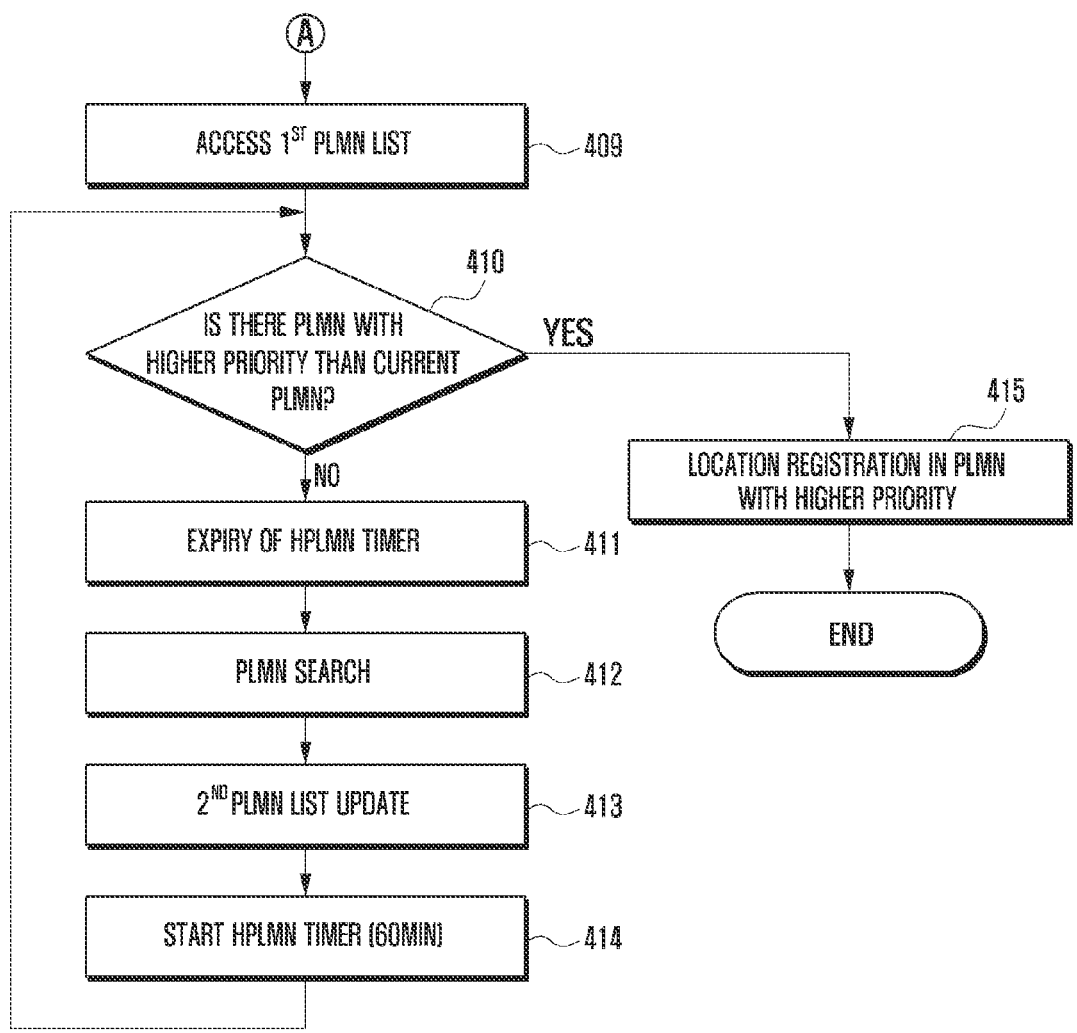

FIGS. 4A and 4B are flow diagrams illustrating a method for selecting a PLMN in a mobile communication device in accordance with a first exemplary embodiment of the present invention.

Referring to FIGS. 4A and 4B, in step 401, the first communication mode control unit 160 starts the HPLMN timer by using the HPLMN timer value stored in the first SIM card 130. For instance, the HPLMN timer value stored in the first SIM card 130 is thirty minutes. In step 402, the second communication mode control unit 170 starts the HPLMN timer by using the HPLMN timer value stored in the second SIM card 140. For instance, the HPLMN timer value stored in the second SIM card 140 is sixty minutes.

Specifically, once the power of the mobile communication device 100 is turned on, the first communication mode control unit 160 retrieves PLMN information, priority information, and the HPLMN timer value from the first SIM card 130. The first communication mode control unit 160 then searches for PLMNs and performs a location registration in the PLMN with the highest priority. Similarly, the second communication mode control unit 170 retrieves PLMN information, priority information, and the HPLMN timer value from the second SIM card 140. The second communication mode control unit 170 then searches for PLMNs and performs a location registration in the PLMN with the highest priority. If a currently location-registered PLMN is not the HPLMN, the first communication mode control unit 160 starts the HPLMN timer. Similarly, the second communication mode control unit 170 starts the HPLMN timer, depending on the determination that a currently location-registered PLMN is not the HPLMN.

Namely, each of the first and second communication mode control units 160 and 170 checks a currently location-registered PLMN and then, if necessary, starts the HPLMN timer. The starting time when the first communication mode control unit 160 starts the HPLMN timer may be the same as or different from the starting time when the second communication mode control unit 170 starts the HPLMN timer. In this disclosure, for convenience in description, it is assumed that the starting times are substantially equal to each other.

Since the HPLMN timer values of the first and second SIM cards 130 and 140 are thirty minutes and sixty minutes, respectively, the HPLMN timer of the first communication mode control unit 160 expires earlier. In step 403, the first communication mode control unit 160 recognizes the expiry of the HPLMN timer.

In step 404, the first communication mode control unit 160 controls the first RF unit 110 and performs a PLMN search. That is, the first communication mode control unit 160 performs a PLMN search by scanning a frequency band with a given range. According to an exemplary embodiment, the first communication mode control unit 160 may perform a scanning for all frequency bands used in a mobile communication or perform a scanning for a specific frequency band used in the first communication mode. For instance, if the first communication mode is a $2^{nd}$ Generation (2G) communication mode, the first communication mode control unit 160 may scan all 2G and $3^{rd}$ Generation (3G) frequency bands ranging from 800 MHz to 2.5 GHz or scan only a 2G frequency band ranging from 800 MHz to 1.5 GHz.

After the PLMN search, in step 405, the first communication mode control unit 160 updates the first PLMN list by using found PLMNs. The first communication mode control unit 160 then stores the first PLMN list in the first PLMN list storage 151. Next, in step 406, the first communication mode control unit 160 notifies the second communication mode control unit 170 of an update of the first PLMN list.

In step 407, the first communication mode control unit 160 determines whether the first PLMN list contains any PLMN with a higher priority than the current PLMN. If so, in step 408 the first communication mode control unit 160 performs a location registration in the PLMN with the higher priority by controlling the first RF unit 110. If the first PLMN list contains no PLMN with the higher priority than the current PLMN, the first communication mode control unit 160 returns to step 401 and starts the HPLMN timer.

The second communication mode control unit 170 that receives the notification of an update of the first PLMN list accesses, in step 409, the first PLMN list stored in the first PLMN list storage 151 and then, in step 410, determines whether the first PLMN list contains any PLMN with a higher priority than the current PLMN. If so, in step 415 the second communication mode control unit 170 performs a location registration in the PLMN with a higher priority by controlling the second RF unit 120.

Since the second communication mode control unit 170 can use the first PLMN list which is the result of the PLMN search by the first communication mode control unit 160, the second communication mode control unit 170 having a longer HPLMN timer value may perform a location transfer to any PLMN with the higher priority without waiting for the expiry of the HPLMN timer. Additionally, if the first PLMN list contains any PLMN with the higher priority, the second communication mode control unit 170 does not need to perform a PLMN search. Therefore, the number of PLMN searches is reduced, so that power consumption can be reduced.

If there is no PLMN with the higher priority than the current PLMN in step 410, the second communication mode control unit 170 waits for the expiry of the HPLMN timer in step 411. When the HPLMN timer expires, the second communication mode control unit 170 performs a PLMN search by controlling the second RF unit 120 in step 412 and updates the second PLMN list by using the result of the PLMN search in step 413. The second communication mode control unit 170 then stores the second PLMN list in the second PLMN list storage 152. Next, in step 414, the second communication mode control unit 170 starts the HPLMN timer again and returns to step 410 to determine whether the second PLMN list contains any PLMN with a higher priority than the current PLMN. If so, the second communication mode control unit 170 proceeds to step 415 and performs a location registration in such a PLMN with a higher priority by controlling the second RF unit 120.

In another exemplary embodiment, after updating the second PLMN list in step 413, the second communication mode control unit 170 may notify the first communication mode control unit 160 of an update of the second PLMN list. If the location has been already registered in the HPLMN, the first communication mode control unit 160 maintains a current state. However, if the location has been registered in any PLMN other than the HPLMN, the first communication mode control unit 160 may access the second PLMN list and determine whether the second PLMN list contains any PLMN with a higher priority than the current PLMN. If so, the first communication mode control unit 160 performs a location registration in the PLMN with the higher priority by controlling the first RF unit 110.

On the other hand, the second communication mode control unit 170 may also receive the notification of an update of the first PLMN list from the first communication mode control unit 160 while performing a PLMN search at the HPLMN timer cycle. The second communication mode control unit 170 may then access the first PLMN list and determine whether the first PLMN list contains any PLMN with a higher priority than the current PLMN. If so, the second communication mode control unit 170 performs a location registration in such a PLMN with a higher priority by controlling the second RF unit 110.

Although FIGS. 4A and 4B illustrate the first and second PLMN lists separately, these lists may be formed of a single common PLMN list. In this case, after a PLMN search, each of the first and second communication mode control units 160 and 170 may update the common PLMN list by using the result of the PLMN search.

Figure 5A:
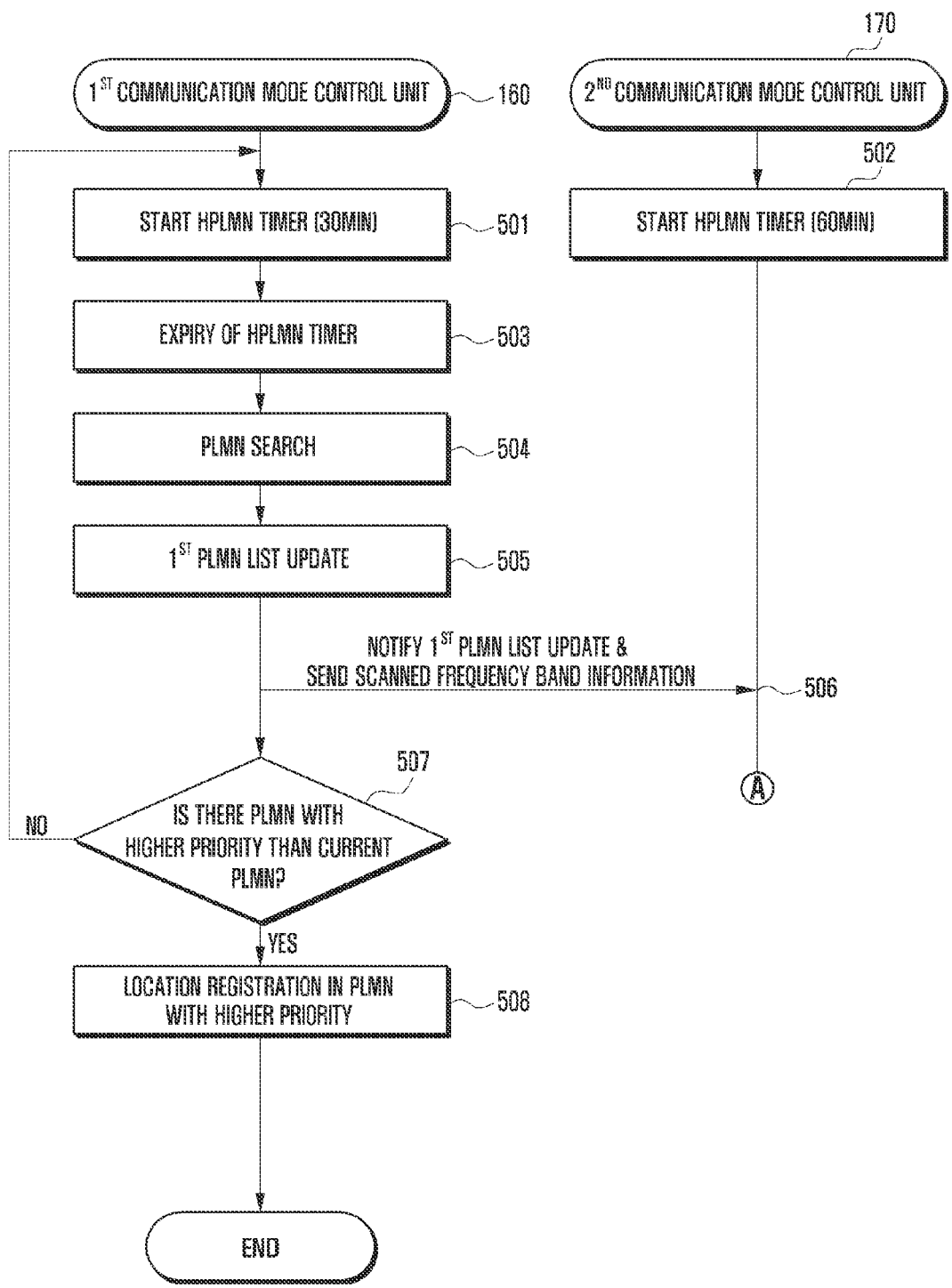
FIGS. 5A and 5B are flow diagrams illustrating a method for selecting a PLMN in a mobile communication device in accordance with a second exemplary embodiment of the present invention.
Figure 5B:
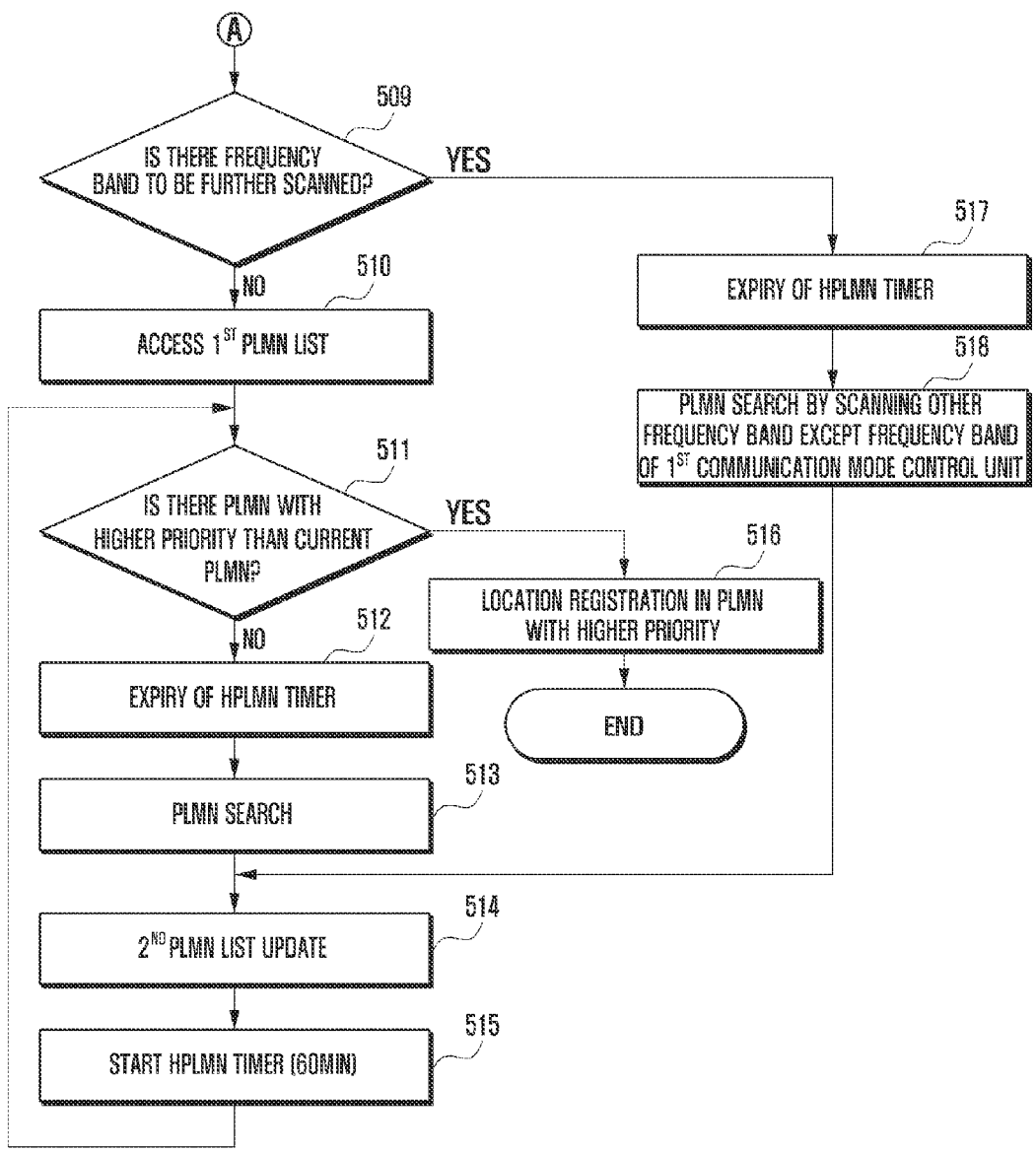

FIGS. 5A and 5B are flow diagrams illustrating a method for selecting a PLMN in a mobile communication device in accordance with a second exemplary embodiment of the present invention. The second embodiment is different from the first embodiment in that the second communication mode control unit 170 may perform, if necessary, a further PLMN search in consideration of a frequency band for which the first communication mode control unit 160 performs a scanning.

Referring to FIGS. 5A and 5B, steps 501 to 505 correspond to steps 401 to 405 in FIG. 4A, and the above discussion about steps 401 to 405 is similarly applied to steps 501 to 505. That is, the first communication mode control unit 160 starts the HPLMN timer by using the HPLMN timer value stored in the first SIM card 130 in step 501, and the second communication mode control unit 170 starts the HPLMN timer by using the HPLMN timer value stored in the second SIM card 140 in step 502. When recognizing the expiry of the HPLMN timer in step 503, the first communication mode control unit 160 searches for PLMNs by controlling the first RF unit 110 in step 504 and then updates the first PLMN list by using the result of the PLMN search in step 505. Additionally, the first communication mode control unit 160 stores the first PLMN list in the first PLMN list storage 151.

In step 506, the first communication mode control unit 160 notifies the second communication mode control unit 170 of an update of the first PLMN list and also sends information about a scanned frequency band to the second communication mode control unit 170. In another exemplary embodiment, if the second communication mode control unit 170 has already stored information about a scanned frequency band of the first communication mode control unit 160, in step 506 the first communication mode control unit 160 may omit a process of sending information about a scanned frequency band to the second communication mode control unit 170.

Steps 507 and 508 correspond to steps 407 and 408 in FIG. 4A. That is, the first communication mode control unit 160 determines in step 507 whether the first PLMN list contains any PLMN with a higher priority than the current PLMN, and if so, in step 508 performs a location registration in the PLMN with the higher priority by controlling the first RF unit 110.

When receiving the notification of an update of the first PLMN list, the second communication mode control unit 170 determines in step 509 whether there is any frequency band to be further scanned in addition to a scanned frequency band of the first communication mode control unit 160. If the second communication mode control unit 170 has already stored information about a scanned frequency band of the first communication mode control unit 160, the second communication mode control unit 170 compares frequency bands scanned by the first and second communication mode control units 160 and 170 and thereby determines whether there is any frequency band to be further scanned in addition to a frequency band scanned by the first communication mode control unit 160. For instance, if the first communication mode control unit 160 scans a frequency band of 800 MHz to 1.5 GHz and if the second communication mode control unit 170 scans a frequency band of 800 MHz to 2.5 GHz, the second communication mode control unit 170 determines in step 509 that a frequency band of 1.5 GHz to 2.5 GHz will be further scanned.

If there is any frequency band to be further scanned in addition to a scanned frequency band of the first communication mode control unit 160, the second communication mode control unit 170 proceeds to step 517 and waits for the expiry of the HPLMN timer. Once recognizing the expiry of the HPLMN timer, the second communication mode control unit 170 searches for PLMNs in step 518 by scanning a further frequency band other than the scanned frequency band of the first communication mode control unit 160. According to the above-mentioned example, the second communication mode control unit 170 searches for PLMNs by scanning a frequency band of 1.5 GHz to 2.5 GHz. Next, the second communication mode control unit 170 proceeds to step 514 and updates the second PLMN list by using the result of the PLMN search. In step 515, the second communication mode control unit 170 starts the HPLMN timer again and proceeds to step 511 to determine whether the first and second PLMN lists contain any PLMN with a higher priority than the current PLMN. If so, the second communication mode control unit 170 proceeds to step 516 and performs a location registration in such a PLMN with a higher priority by controlling the second RF unit 120.

If it is determined in step 509 that there is no frequency band to be further scanned in addition to a scanned frequency band of the first communication mode control unit 160, the second communication mode control unit 170 proceeds to step 510 and accesses the first PLMN list stored in the first PLMN list storage 151. This is a case, where a frequency band scanned by the first communication mode control unit 160 is equal to or includes a frequency band scanned by the second communication mode control unit 170.

In step 511, the second communication mode control unit 170 determines whether the first PLMN list contains any PLMN with a higher priority than the current PLMN. If so, the second communication mode control unit 170 proceeds to step 516 and performs a location registration in the PLMN with the higher priority by controlling the second RF unit 120.

If there is no PLMN with the higher priority than the current PLMN, the second communication mode control unit 170 proceeds to step 512 and waits for the expiry of the HPLMN timer. Once the HPLMN timer expires, the second communication mode control unit 170 performs a PLMN search by controlling the second RF unit 120 in step 513 and updates the second PLMN list by using the result of the PLMN search in step 514. More particularly, in step 514, the second communication mode control unit 170 performs a scanning for all frequency bands by controlling the second RF unit 120. Next, in step 515, the second communication mode control unit 170 starts the HPLMN timer again and returns to step 511 to determine whether the second PLMN list contains any PLMN with the higher priority than the current PLMN. If so, the second communication mode control unit 170 performs, in step 516, a location registration in the PLMN with the higher priority by controlling the second RF unit 120.

After updating the second PLMN list in step 514, the second communication mode control unit 170 may notify the first communication mode control unit 160 of an update of the second PLMN list. If the location has been already registered in the HPLMN, the first communication mode control unit 160 maintains a current state. However, if the location has been registered in any PLMN other than the HPLMN, the first communication mode control unit 160 may access the second PLMN list and determine whether the second PLMN list contains any PLMN with a higher priority than the current PLMN. If so, the first communication mode control unit 160 performs a location registration in the PLMN with the higher priority by controlling the first RF unit 110.

Additionally, the second communication mode control unit 170 may receive the notification of an update of the first PLMN list from the first communication mode control unit 160 while performing a PLMN search based on the HPLMN timer cycle. The second communication mode control unit 170 may then access the first PLMN list and determine whether the first PLMN list contains any PLMN with a higher priority than the current PLMN. If so, the second communication mode control unit 170 performs a location registration in such a PLMN with a higher priority by controlling the second RF unit 110.

In FIGS. 5A and 5B, the first and second PLMN lists may be formed of a single common PLMN list. In this case, each of the first and second communication mode control units 160 and 170 may update the common PLMN list by using the result of the PLMN search.

Figure 6:
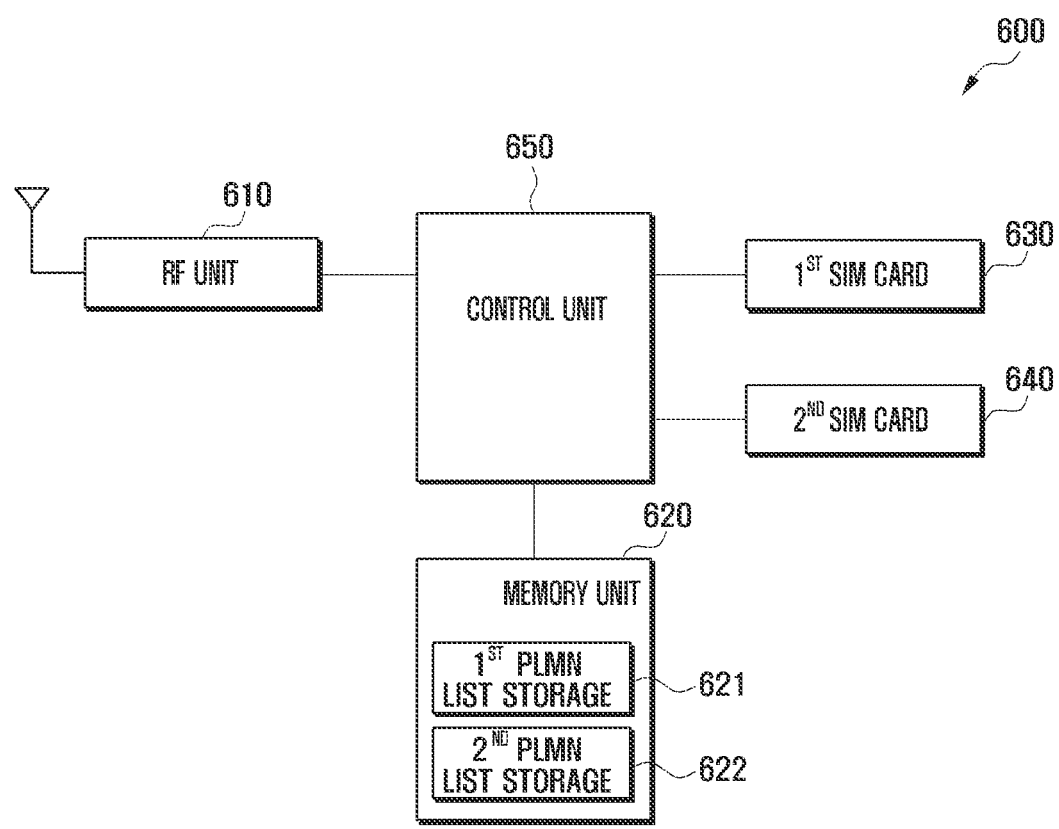
FIG. 6 is a block diagram illustrating a mobile communication device in accordance with another exemplary embodiment of the present invention.

FIG. 6 is a block diagram illustrating a mobile communication device in accordance with another exemplary embodiment of the present invention. The mobile communication device 600 shown in FIG. 6 is applied to PLMN selection methods in accordance with third and fourth embodiments which will be discussed below. The mobile communication device 600 in FIG. 6 is characterized by having a single control unit 650.

Referring to FIG. 6, the mobile communication device 600 includes an RF unit 610, a memory unit 620, a first SIM card 630, a second SIM card 640, and a control unit 650.

The RF unit 610 corresponds to the first and second RF units 110 and 120 shown in FIG. 3. Under the control of the control unit 650, the RF unit 610 scans a specific frequency band and thereby performs a PLMN search. Although FIG. 6 illustrates a single RF unit 610, the mobile communication device 600 in another exemplary embodiment may have a first RF unit for the first SIM card 630 and a second RF unit for the second SIM card 640.

The memory unit 620 corresponds to the memory unit 150 shown in FIG. 3. The memory unit 620 includes a first PLMN list storage 621 and a second PLMN list storage 622. The first PLMN list storage 621 stores the first PLMN list, and the second PLMN list storage 622 stores the second PLMN list. Although FIG. 6 illustrates separate PLMN list storages 621 and 622, the memory unit 620 in another exemplary embodiment may have a single storage for the first and second PLMN list storages 621 and 622. Furthermore, in another exemplary embodiment, the first and second PLMN lists may be united to form a single common PLMN list.

The first and second SIM cards 630 and 640 correspond to the first and second SIM cards 130 and 140 shown in FIG. 3. Each of the SIM cards 630 and 640 has information about IDs and priorities of PLMNs including the HPLMN, and also stores a given HPLMN timer value.

The control unit 650 is a controller for controlling the first and second communication modes. The control unit 650 retrieves all of PLMN information, priority information and the HPLMN timer value from the first and second SIM cards 630 and 640. The control unit 650 has two internal timers to be used for the HPLMN timer. The control unit 650 starts the first HPLMN timer according to the HPLMN timer value of the first SIM card 630 and also starts the second HPLMN timer according to the HPLMN timer value of the second SIM card 640. If the first HPLMN timer expires earlier than the second HPLMN timer, the control unit 650 searches for PLMNs by controlling the RF unit 610, creates the first PLMN list with found PLMNs, and stores the first PLMN list in the first PLMN list storage 621. The control unit 650 determines whether the first PLMN list contains any PLMN with a higher priority than the current PLMN in connection with the first communication mode, and if so, performs a location registration in the PLMN with the higher priority by controlling the RF unit 610. Additionally, the control unit 650 determines whether the first PLMN list contains any PLMN with a higher priority than the current PLMN in connection with the second communication mode, and if so, performs a location registration in the PLMN with the higher priority by controlling the RF unit 610.

If the first PLMN list contains no PLMN with the higher priority than the current PLMN in connection with the second communication mode, the control unit 650 checks the expiry of the second HPLMN timer and performs a PLMN search. The control unit 650 then creates the second PLMN list with found PLMNs and stores the second PLMN list in the second PLMN list storage 622. Also, the control unit 650 determines whether the second PLMN list contains any PLMN with a higher priority than the current PLMN in connection with the second communication mode, and if so, performs a location registration in such a PLMN with a higher priority by controlling the RF unit 610.

In an exemplary embodiment, the control unit 650 may compare a frequency band to be scanned for a PLMN search after the expiry of the first HPLMN timer with a frequency band to be scanned for a PLMN search after the expiry of the second HPLMN timer. If the latter frequency band is broader, the control unit 650 may control the RF unit 610 after the expiry of the second PLMN timer and thereby perform a PLMN search through a scanning for a frequency band other than the frequency band scanned after the expiry of the first PLMN timer.

Figure 7:
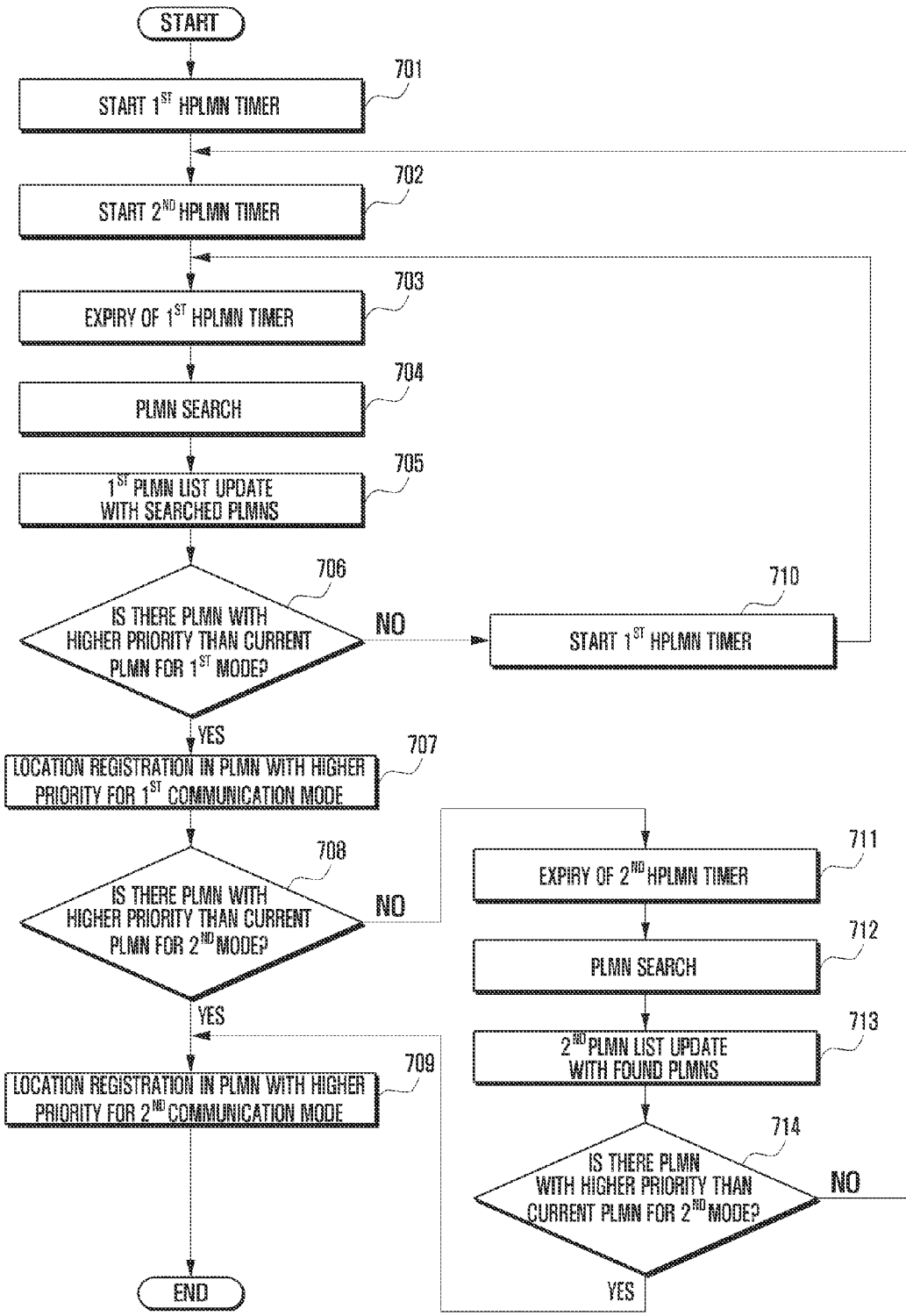
FIG. 7 is a flow diagram illustrating a method for selecting a PLMN in a mobile communication device in accordance with a third exemplary embodiment of the present invention.

FIG. 7 is a flow diagram illustrating a method for selecting a PLMN in a mobile communication device in accordance with a third exemplary embodiment of the present invention.

Referring to FIG. 7, in step 701, the control unit 650 starts the first HPLMN timer by using the HPLMN timer value stored in the first SIM card 630 and, in step 702, starts the second HPLMN timer by using the HPLMN timer value stored in the second SIM card 640. For instance, the HPLMN timer value stored in the first SIM card 630 is thirty minutes, and the HPLMN timer value stored in the second SIM card 640 is sixty minutes.

More specifically, once the power of the mobile communication device 600 is turned on, the control unit 650 retrieves PLMN information, priority information, and the HPLMN timer value from the first SIM card 630. The control unit 650 then performs a PLMN search and also performs a location registration in the PLMN with the highest priority. Similarly, the control unit 650 retrieves PLMN information, priority information, and the HPLMN timer value from the second SIM card 640, performs a PLMN search, and performs a location registration in the PLMN with the highest priority.

If a currently location-registered PLMN is not the HPLMN in connection with the first communication mode, the control unit 650 starts the first HPLMN timer. Similarly, if a currently location-registered PLMN is not the HPLMN in connection with the second communication mode, the control unit 650 starts the second HPLMN timer.

Namely, the control unit 650 checks a currently location-registered PLMN and then, if necessary, starts the HPLMN timer. The starting time when the control unit 650 starts the first HPLMN timer may be the same as or different from starting time when the control unit 650 starts the second HPLMN timer. For convenience in description, in this disclosure, it is assumed that the starting times are substantially to each other.

Since the HPLMN timer values of the first and second SIM cards 630 and 640 are thirty minutes and sixty minutes, respectively, the first HPLMN timer expires earlier. In step 703, the control unit 650 recognizes the expiry of the first HPLMN timer.

In step 704, the control unit 650 controls the RF unit 610 and performs a PLMN search. That is, the control unit 650 performs a PLMN search by scanning a frequency band with a given range. According to an exemplary embodiment, the control unit 650 may perform a scanning for all frequency bands used in a mobile communication or perform a scanning for a specific frequency band used in the first communication mode.

After the PLMN search, in step 705, the control unit 650 updates the first PLMN list by using found PLMNs. The control unit 650 then stores the first PLMN list in the first PLMN list storage 621.

In step 706, the control unit 650 determines whether the first PLMN list contains any PLMN with a higher priority than the current PLMN with regard to the first communication mode. If so, in step 707 the control unit 650 performs a location registration in the PLMN with the higher priority with regard to the first communication mode by controlling the RF unit 610. If the first PLMN list contains no PLMN with the higher priority than the current PLMN with regard to the first communication mode, the control unit 650 starts the first HPLMN timer again in step 710 and then returns to step 703.

In step 708, the control unit 650 determines whether the first PLMN list contains any PLMN with a higher priority than the current PLMN with regard to the second communication mode. If so, in step 709 the control unit 650 performs a location registration in the PLMN with the higher priority with regard to the second communication mode by controlling the RF unit 610.

Since the control unit 650 can use the first PLMN list, which is the result of the PLMN search after the expiry of the first HPLMN timer, in both the first and second communication modes, the control unit 650 may perform a location transfer to any PLMN with the higher priority with regard to the second communication mode without waiting for the expiry of the second HPLMN timer. Additionally, if the first PLMN list contains any PLMN with the higher priority with regard to the second communication mode, the control unit 650 does not need to perform a PLMN search. Therefore, the number of PLMN searches is reduced, so that power consumption can be reduced.

If it is determined in step 708 that the first PLMN list contains no PLMN with the higher priority than the current PLMN with regard to the second communication mode, the control unit 650 proceeds to step 711 and waits for the expiry of the second HPLMN timer. When the second HPLMN timer expires, the control unit 650 performs a PLMN search by controlling the RF unit 610 in step 712 and updates the second PLMN list by using the result of the PLMN search in step 713. The control unit 650 then stores the second PLMN list in the second PLMN list storage 622. Thereafter, in step 714, the control unit 650 determines whether the first PLMN list contains any PLMN with a higher priority than the current PLMN with regard to the second communication mode. If so, in step 709 the control unit 650 performs a location registration in the PLMN with the higher priority with regard to the second communication mode by controlling the RF unit 610.

If it is determined in step 714 that the first PLMN list contains no PLMN with the higher priority than the current PLMN with regard to the second communication mode, the control unit 650 returns to step 702 and starts the second PLMN timer again.

Although FIG. 7 illustrates the first and second PLMN lists separately, these lists may be formed of a single common PLMN list. In this case, the control unit 650 may perform a PLMN search at the expiry of the first or second HPLMN timer and then update the common PLMN list by using the result of the PLMN search.

Figure 8A:
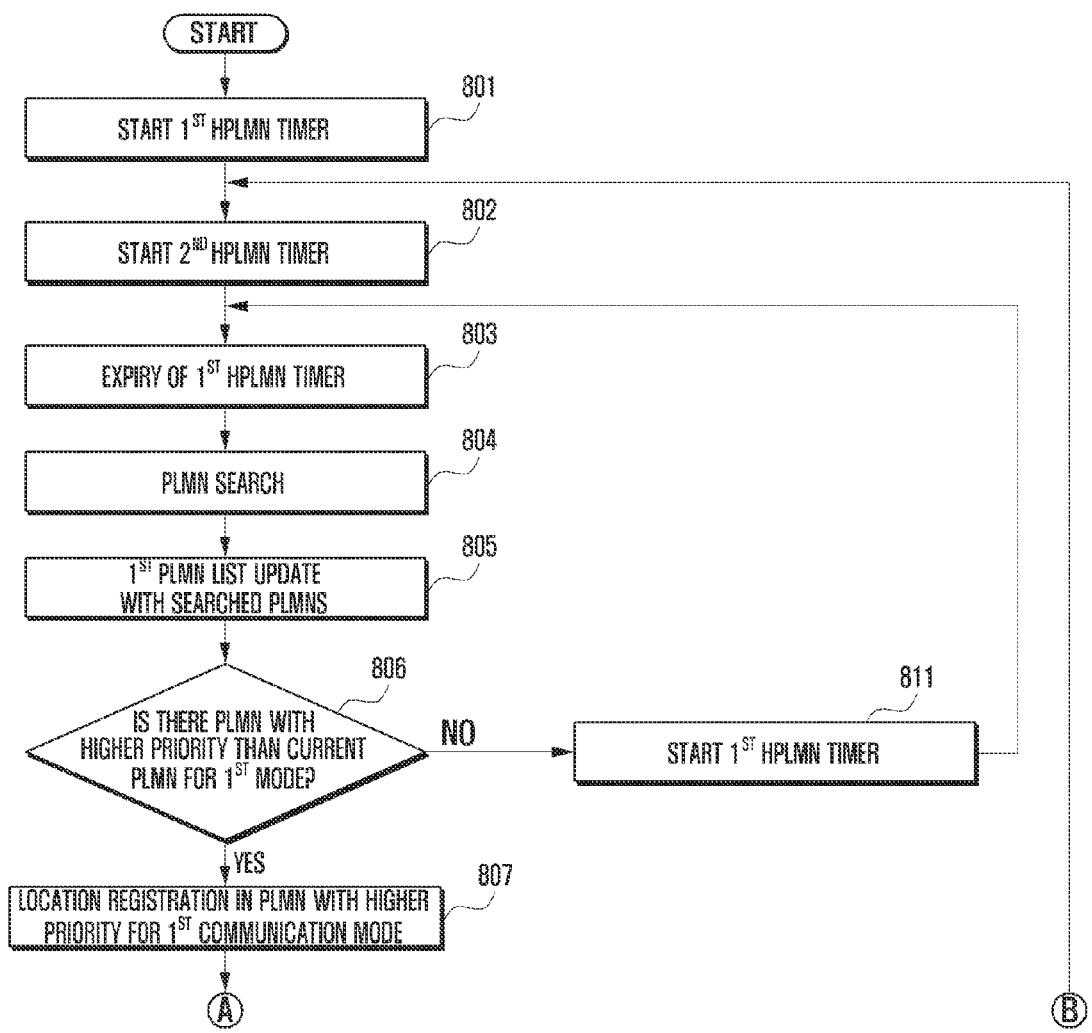
FIGS. 8A and 8B are flow diagrams illustrating a method for selecting a PLMN in a mobile communication device in accordance with a fourth exemplary embodiment of the present invention.
Figure 8B:
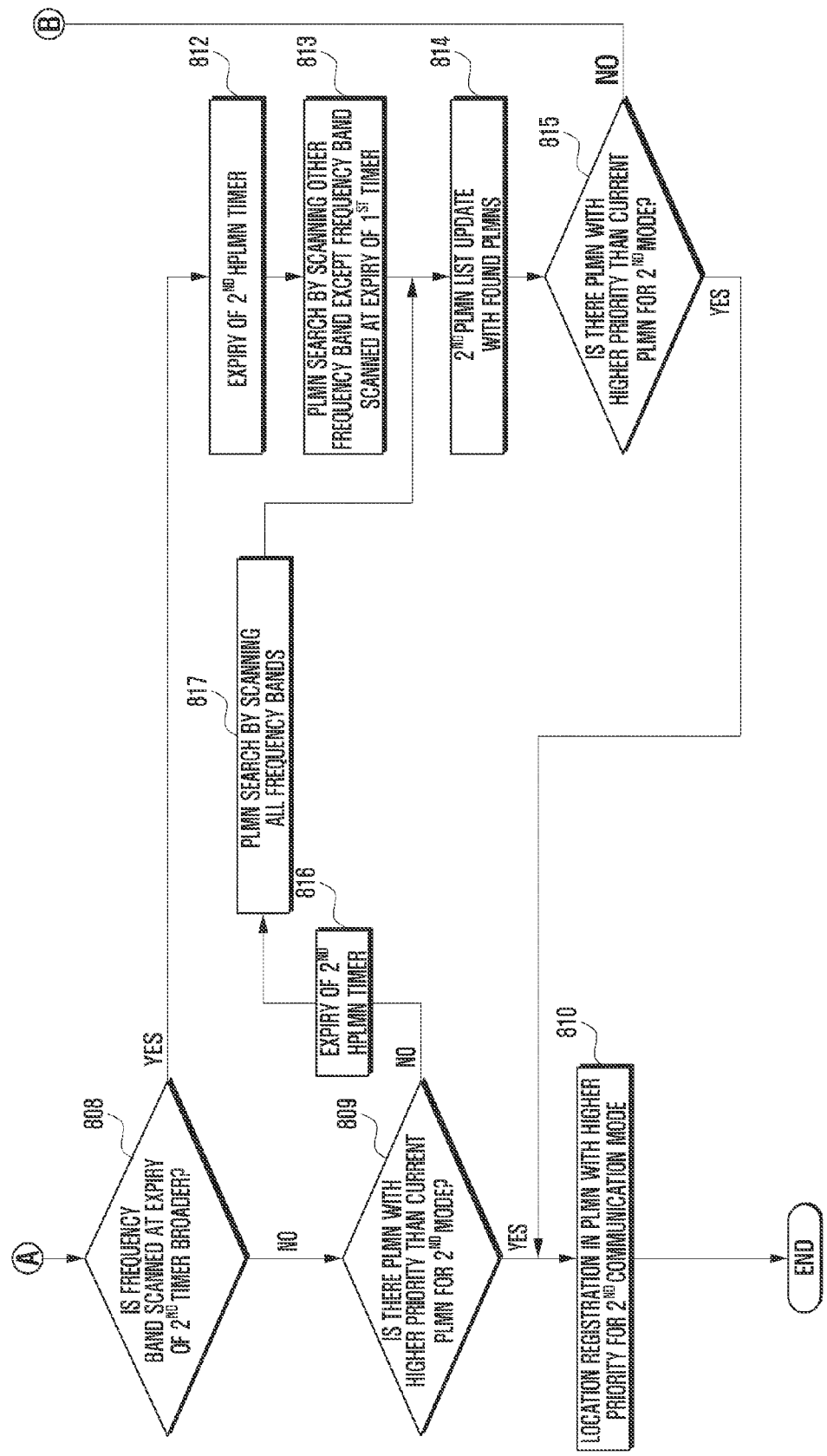

FIGS. 8A and 8B are flow diagrams illustrating a method for selecting a PLMN in a mobile communication device in accordance with a fourth exemplary embodiment of the present invention. The fourth embodiment is characterized in that the control unit 650 compares a frequency band to be scanned for a PLMN search after the expiry of the first HPLMN timer with a frequency band to be scanned for a PLMN search after the expiry of the second HPLMN timer, and if the latter frequency band is relatively broader, performs a PLMN search through a scanning for a frequency band other than the frequency band scanned after the expiry of the first PLMN timer by controlling the RF unit 610.

Referring to FIGS. 8A and 8B, steps 801 to 807 and 811 correspond to steps 701 to 707 and 710 in FIG. 7, and the above discussion about steps 701 to 707 and 710 is similarly applied to steps 801 to 807 and 811.

Namely, the control unit 650 starts the first HPLMN timer by using the HPLMN timer value stored in the first SIM card 630 in step 801 and also starts the second HPLMN timer by using the HPLMN timer value stored in the second SIM card 640 in step 802. When recognizing the expiry of the first HPLMN timer in step 803, the control unit 650 searches for PLMNs by controlling the RF unit 610 in step 804 and then updates the first PLMN list by using the result of the PLMN search in step 805. The control unit 650 then determines, in step 806, whether the first PLMN list contains any PLMN with a higher priority than the current PLMN with regard to the first communication mode. If so, in step 807 the control unit 650 performs a location registration in the PLMN with the higher priority with regard to the first communication mode by controlling the RF unit 610. If the first PLMN list contains no PLMN with the higher priority than the current PLMN with regard to the first communication mode, the control unit 650 starts the first HPLMN timer again in step 811 and then returns to step 803.

In step 808, the control unit 650 determines whether a frequency band to be scanned for a PLMN search after the expiry of the second HPLMN timer is broader than a frequency band to be scanned for a PLMN search after the expiry of the first HPLMN timer. Both frequency bands may be different from each other.

If a frequency band to be scanned for a PLMN search after the expiry of the second HPLMN timer is broader, the control unit 650 proceeds to step 812 and waits for the expiry of the second HPLMN timer. When the second HPLMN timer expires, the control unit 650 performs in step 813 a PLMN search through a scanning for a frequency band other than a frequency band scanned after the expiry of the first PLMN timer by controlling the RF unit 610.

The control unit 650 then updates, in step 814, the second PLMN list by using the result of the PLMN search and also determines, in step 815, whether the first and second PLMN lists contain any PLMN with a higher priority than the current PLMN with regard to the second communication mode. If so, the control unit 650 proceeds to step 810 and performs a location registration in the PLMN with a higher priority with regard to the second communication mode by controlling the RF unit 610. If the first and second PLMN lists contain no PLMN with a higher priority than the current PLMN with regard to the second communication mode, the control unit 650 returns to step 802 and starts the second HPLMN timer again.

If it is determined in step 808 that a frequency band to be scanned for a PLMN search after the expiry of the second HPLMN timer is equal to or smaller than a frequency band to be scanned for a PLMN search after the expiry of the first HPLMN timer, the control unit 650 proceeds to step 809 and determines whether the first PLMN list contains any PLMN with a higher priority than the current PLMN with regard to the second communication mode. If so, the control unit 650 proceeds to step 810 and performs a location registration in the PLMN with the higher priority with regard to the second communication mode by controlling the RF unit 610.

If the first PLMN list contains no PLMN with the higher priority than the current PLMN with regard to the second communication mode, the control unit 650 proceeds to step 816 and waits for the expiry of the second HPLMN timer. When the second HPLMN timer expires, the control unit 650 performs in step 817 a PLMN search through a scanning for all frequency bands by controlling the RF unit 610. Here, all frequency bands correspond to a frequency band scanned for a PLMN search after the expiry of the second HPLMN timer. Next, the control unit 650 proceeds to step 814 and updates the second PLMN list by using the result of the PLMN search. In step 815, the control unit 650 determines whether the second PLMN list contains any PLMN with the higher priority than the current PLMN with regard to the second communication mode. If so, the control unit 650 proceeds to step 810 and performs a location registration in the PLMN with the higher priority with regard to the second communication mode by controlling the RF unit 610.

When performing a scanning at the expiry of the second HPLMN timer, the control unit 650 performs a scanning for a frequency band other than the frequency band scanned after the expiry of the first PLMN timer. Therefore, scanning time is reduced, so that PLMN search time can be reduced.

While the invention has been shown and described with reference to certain exemplary embodiment thereof, it will be understood by those skilled in the art that various changes in form and details may be made therein without departing from the spirit and scope of the invention as defined by the appended claims and their equivalents.

What is claimed is:

1. A method for searching for a Public Land Mobile Network (PLMN) in a mobile communication device having a plurality of Subscriber Identification Module (SIM) cards, the method comprising:

separately starting a plurality of Home PLMN (HPLMN) timers according to a corresponding plurality of HPLMN timer values stored respectively in the plurality of SIM cards;

performing a PLMN search for one of the plurality of SIM cards at an expiry of a corresponding one of the plurality of HPLMN timers;

updating a PLMN list with one or more PLMNs found during the PLMN search;
for all of the plurality of SIM cards, determining whether the PLMN list contains any PLMN with a higher priority than a currently registered PLMN; and
for any SIM card of the plurality of SIM cards in which there is any PLMN with the higher priority than the currently registered PLMN, performing a location registration in the PLMN with the higher priority.

2. The method of claim 1, further comprising:
for any SIM card of the plurality of SIM cards in which there is no PLMN with the higher priority than the currently registered PLMN, performing another PLMN search at an expiry of a corresponding HPLMN timer;
updating the PLMN list with one or more PLMNs found during the other PLMN search; and
if the updated PLMN list contains any PLMN with the higher priority than the currently registered PLMN, performing the location registration in the PLMN with the higher priority.

3. A method for searching for a Public Land Mobile Network (PLMN) in a mobile communication device having a first Subscriber Identification Module (SIM) card, a second SIM card, a first communication mode control unit for controlling the first SIM card, and a second communication mode control unit for controlling the second SIM card, the method comprising:
at the first communication mode control unit, starting a first Home PLMN (HPLMN) timer according to a first HPLMN timer value stored in the first SIM card, and at the second communication mode control unit, starting a second HPLMN timer according to a second HPLMN timer value stored in the second SIM card;
at the first communication mode control unit, performing a first PLMN search at an expiry of the first HPLMN timer;
at the first communication mode control unit, updating a first PLMN list with one or more PLMNs found during the first PLMN search;
at the first communication mode control unit, notifying the second communication mode control unit of the update of the first PLMN list;
at the first communication mode control unit, determining whether the first PLMN list contains any PLMN with a higher priority than a currently registered PLMN, and at the second communication mode control unit, determining whether the first PLMN list contains any PLMN with the higher priority than the currently registered PLMN; and
if the first PLMN list contains any PLMN with the higher priority than the currently registered PLMN, at each of the first and second communication mode control units, performing a location registration in the PLMN with the higher priority.

4. The method of claim 3, further comprising:
if the second communication mode control unit determines that the first PLMN list contains no PLMN with the higher priority than the currently registered PLMN, at the second communication mode control unit, performing a second PLMN search at an expiry of the second HPLMN timer;
at the second communication mode control unit, creating a second PLMN list with one or more PLMNs found during the second PLMN search and storing the second PLMN list;
at the second communication mode control unit, determining whether the second PLMN list contains any PLMN with the higher priority than the currently registered PLMN; and
if the second PLMN list contains any PLMN with the higher priority than the currently registered PLMN, at the second communication mode control unit, performing the location registration in the PLMN with the higher priority.

5. The method of claim 3, wherein the notifying of the second communication mode control unit of the update of the first PLMN list includes sending information about a scanned frequency band of the first communication mode control unit to the second communication mode control unit.

6. The method of claim 5, further comprising:
at the second communication mode control unit, determining whether there is any frequency band to be scanned other than the scanned frequency band of the first communication mode control unit;
if there is any frequency band to be scanned other than the scanned frequency band of the first communication mode control unit, at the second communication mode control unit, performing a second PLMN search in the other frequency bands other than the scanned frequency band of the first communication mode control unit at an expiry of the second HPLMN timer;
at the second communication mode control unit, creating a second PLMN list with one or more PLMNs found during the second PLMN search and storing the second PLMN list;
at the second communication mode control unit, determining whether either of the first and second PLMN lists contain any PLMN with the higher priority than the currently registered PLMN; and
if either of the first and second PLMN lists contain any PLMN with the higher priority than the currently registered PLMN, at the second communication mode control unit, performing the location registration in the PLMN with the higher priority.

7. A method for searching for a Public Land Mobile Network (PLMN) in a mobile communication device having a first Subscriber Identification Module (SIM) card and a second SIM card, the method comprising:
starting a first Home PLMN (HPLMN) timer according to a first HPLMN timer value stored in the first SIM card, and starting a second HPLMN timer according to a second HPLMN timer value stored in the second SIM card;
performing a first PLMN search at an expiry of the first HPLMN timer;
creating a first PLMN list with one or more PLMNs found during the first PLMN search and storing the first PLMN list;
determining whether the first PLMN list contains any PLMN with a higher priority than a currently registered PLMN with regard to the first SIM card, and determining whether the first PLMN list contains any PLMN with the higher priority than the currently registered PLMN with regard to the second SIM card; and
if the first PLMN list contains any PLMN with the higher priority than the currently registered PLMN with regard to the first SIM card, performing a location registration in the PLMN with the higher priority with regard to the first SIM card, and if the first PLMN list contains a PLMN with the higher priority than the currently registered PLMN with regard to the second SIM card, performing the location registration in the PLMN with the higher priority with regard to the second SIM card.

8. The method of claim 7, further comprising:
if the first PLMN list contains no PLMN with the higher priority than the currently registered PLMN with regard to the second SIM card,
performing a second PLMN search at an expiry of the second HPLMN timer;
creating a second PLMN list with one or more PLMNs found during the second PLMN search and storing the second PLMN list;
determining whether the second PLMN list contains any PLMN with the higher priority than the currently registered PLMN with regard to the second SIM card; and
if the second PLMN list contains any PLMN with the higher priority than the currently registered PLMN, performing the location registration in the PLMN with the higher priority with regard to the second SIM card.

9. The method of claim 7, further comprising:
comparing a frequency band scanned for the first SIM card with a frequency band scanned for the second SIM card;
if the frequency band scanned for the second SIM card is broader than the frequency band scanned for the first SIM card, performing a second PLMN search by scanning frequency bands other than the frequency band scanned for the first SIM card;
creating a second PLMN list with one or more PLMNs found during the second PLMN search and storing the second PLMN list;
determining whether either of the first and second PLMN lists contain any PLMN with the higher priority than the currently registered PLMN with regard to the second SIM card; and
if either of the first and second PLMN lists contain any PLMN with the higher priority than the currently registered PLMN, performing the location registration in the PLMN with the higher priority with regard to the second SIM card.

10. A mobile communication device comprising:
a first Subscriber Identification Module (SIM) card for storing a first timer value of a first Home PLMN (HPLMN) timer;
a second SIM card for storing a second timer value of a second HPLMN timer;
a memory unit for storing a first Public Land Mobile Network (PLMN) list updated by a first communication mode control unit and a second PLMN list updated by a second communication mode control unit;
the first communication mode control unit for starting the first HPLMN timer, for controlling to perform a PLMN search at an expiry of the first HPLMN timer, to create the first PLMN list with one or more PLMNs found during the first PLMN search, for storing the first PLMN list in the memory unit, for controlling to notify the second communication mode control unit of an update of the first PLMN list, for determining whether the first PLMN list contains any PLMN with a higher priority than a currently registered PLMN, and if the first PLMN list contains any PLMN with the higher priority than the currently registered PLMN, for controlling to perform a location registration in the PLMN with the higher priority; and the second communication mode control unit for starting the second HPLMN timer, for determining whether the first PLMN list contains any PLMN with the higher priority than the currently registered PLMN when the notification of the update of the first PLMN list is received from the first communication mode control unit, and if the first PLMN list contains any PLMN with the higher priority than the currently registered PLMN, for controlling to perform the location registration in the PLMN with the higher priority.

11. The mobile communication device of claim 10, wherein the second communication mode control unit:
if the first PLMN list contains no PLMN with the higher priority than the currently registered PLMN, controls to perform a second PLMN search at an expiry of the second HPLMN timer,
creates a second PLMN list with one or more PLMNs found during the second PLMN search,
stores the second PLMN list in the memory, determines whether the second PLMN list contains any PLMN with the higher priority than the currently registered PLMN, and
if the second PLMN list contains any PLMN with the higher priority than the currently registered PLMN, controls to perform the location registration in the PLMN with the higher priority.

12. The mobile communication device of claim 10, wherein the first communication mode control unit, when notifying of the second communication mode control unit of the update of the first PLMN list, sends information about a scanned frequency band of the first communication mode control unit to the second communication mode control unit.

13. The mobile communication device of claim 12, wherein the second communication mode control unit:
determines whether there is any frequency band to be scanned other than the scanned frequency band of the first communication mode control unit,
if there is any frequency band to be scanned other than the scanned frequency band of the first communication mode control unit, controls to perform a second PLMN search in the other frequency bands other than the scanned frequency band of the first communication mode control unit at an expiry of the second HPLMN timer,
creates a second PLMN list with one or more PLMNs found during the second PLMN search and stores the second PLMN list,
determines whether either of the first and second PLMN lists contain any PLMN with the higher priority than the currently registered PLMN, and
if either of the first and second PLMN lists contain any PLMN with the higher priority than the currently registered PLMN, controls to perform the location registration in the PLMN with the higher priority.

\* \* \* \* \*